(12) United States Patent
Mai

(10) Patent No.: US 8,092,289 B2
(45) Date of Patent: Jan. 10, 2012

(54) TECHNIQUES FOR USE WITH COMPUTERIZED GAMES HAVING CARDS

(75) Inventor: Jason Mai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 11/820,138

(22) Filed: Jun. 18, 2007

(65) Prior Publication Data

US 2008/0311984 A1    Dec. 18, 2008

(51) Int. Cl.
    *A63F 13/00* (2006.01)
(52) U.S. Cl. ............... 463/11; 463/9; 463/31; 463/42
(58) Field of Classification Search ............. 463/9, 11, 463/31, 42
    See application file for complete search history.

(56) References Cited

U.S. PATENT DOCUMENTS

| | | | |
|---|---|---|---|
| 5,518,253 A * | 5/1996 | Pocock et al. .................. | 463/19 |
| 5,833,536 A | 11/1998 | Davids et al. | |
| 5,882,258 A | 3/1999 | Kelly et al. | |
| 6,030,289 A * | 2/2000 | Nomi et al. ...................... | 463/32 |
| 6,077,161 A * | 6/2000 | Wisler ............................. | 463/11 |
| 6,089,977 A | 7/2000 | Bennett | |
| 6,386,973 B1 * | 5/2002 | Yoseloff .......................... | 463/13 |
| 6,625,578 B2 | 9/2003 | Spaur et al. | |
| 6,695,700 B2 | 2/2004 | Walker et al. | |
| 6,852,027 B2 | 2/2005 | Kaminkow et al. | |
| 6,899,619 B2 * | 5/2005 | Efremov ......................... | 463/11 |
| 6,948,938 B1 | 9/2005 | Tseng | |
| 2004/0204246 A1 * | 10/2004 | Halliburton et al. ............ | 463/42 |
| 2005/0090304 A1 | 4/2005 | Crawford, III et al. | |
| 2005/0236774 A1 | 10/2005 | Loewenstein et al. | |
| 2007/0004486 A1 | 1/2007 | Stewart et al. | |

OTHER PUBLICATIONS

"BVS Solitaire Collection", http://www.bvssolitaire.com/.
"GameBox Solitaire 1.0", http://www.top-shareware.net/GameBox_Solitaire.html.
"Solitaire City for Windows v3.10", http://www.solitairecity.com/.
Hansen, et al., "On the Role of Animated Analogies in Algorithm Visualizations", Fourth International Conference of the Learning Sciences, Date: 2000, pp. 205-211.

* cited by examiner

*Primary Examiner* — Pierre Eddy Elisca
*Assistant Examiner* — Shahid Kamal

(57) ABSTRACT

Techniques are described for determining card movement in a computerized game. A representation of one or more cards to be played in a simulated environment is provided. A movement of at least one of said cards is determined in accordance with one or more of an attribute of the card and a current condition in the simulated environment.

20 Claims, 11 Drawing Sheets

TECHNIQUES FOR USE WITH COMPUTERIZED GAMES HAVING CARDS

BACKGROUND

Video games include a wide variety of different game types including card games. Electronic card games may be played on different devices including special electronic gaming devices as well as home computer systems. The card games include traditional card games, such as solitaire. Existing electronic card games may use different techniques in order to provide players with a new gaming experience while playing a traditional card game. One way in which existing card games try to enhance the card playing experience is through the use of visual enhancements, such as changing the graphics and coloring on the card backs. As another technique, existing card games may vary or extend the rules of the traditional card game. Such variations may include providing hints to a player regarding which cards to play, and allowing a player to perform an action not allowed by the traditional rules, such as undoing the last card move, shuffling a card deck in solitaire during the middle of card play, and the like. As another technique, existing card games may have secondary goals or "meta games". Secondary goals may include an extra bonus or virtual game award for achieving a threshold number of gaming wins. Meta games may provide a secondary overarching storyline in which each player's hand of the card game advances the player's progress toward a storyline goal. As an example, each winning card hand may advance a player's progress toward a virtual prize.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for determining card movement in a computerized game. A representation of one or more cards to be played in a simulated environment is provided. A movement of at least one of said cards is determined in accordance with one or more of an attribute of the card and a current condition in the simulated environment.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
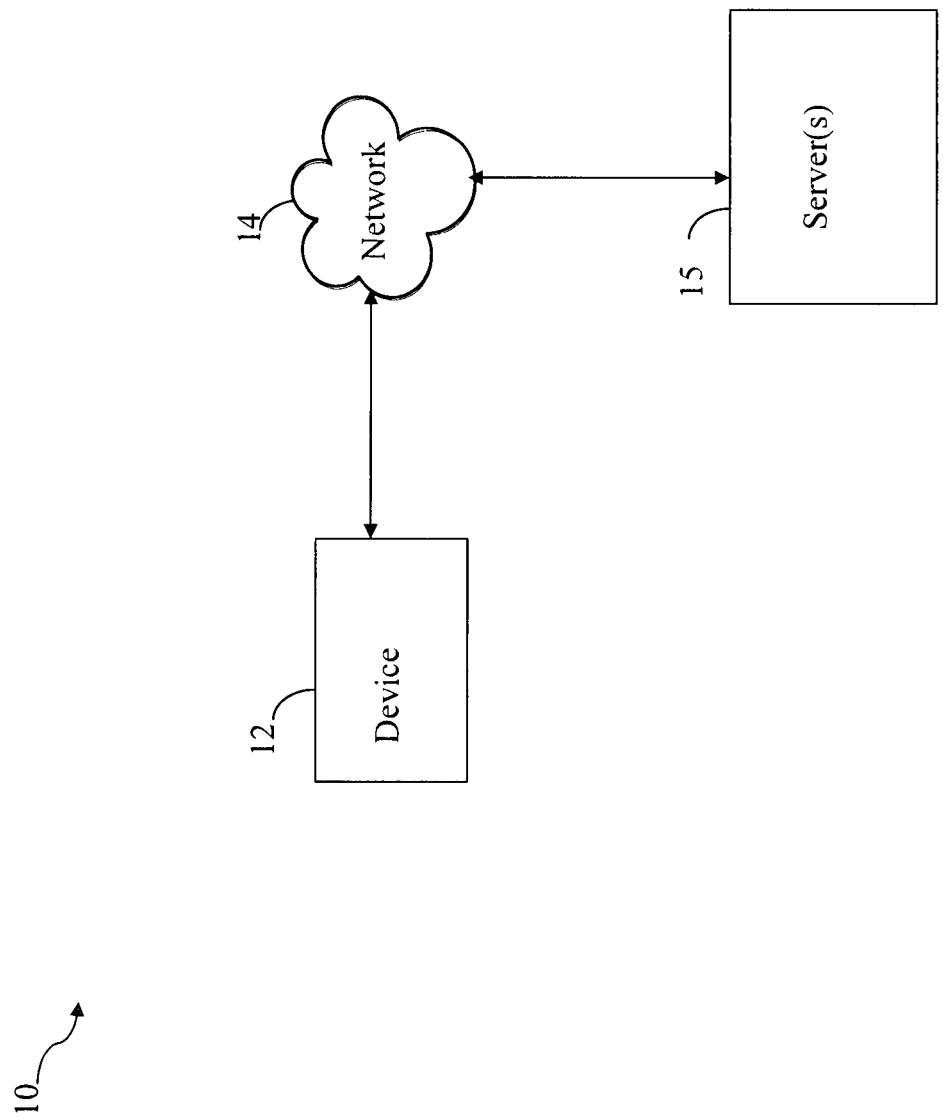
FIG. 1 is an example of an embodiment illustrating an environment that may be utilized in connection with the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with a computerized game with cards.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The computerized games described herein may also be included in a specialized game device rather than a more general purpose device such as a computer system.

Included in FIG. 1 are a device 12, a network 14, and a server 15. The device 12 may be, for example, a computer, such as a personal computer, having a display output device and an input device providing for interactive I/O with a user thereof. In following paragraphs, additional details are provided with respect to the device 12. However, the same details may also apply to one or more other devices that may be connected to the network 14 in an embodiment. Although the example 10 of FIG. 1 includes only a single device and a single server, an embodiment utilizing the techniques herein may include any number of devices and other components.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the server 15 and other computers or components not shown in FIG. 1. As described herein, the device 12 may be a personal computer. In other embodiments, the functionality of device 12, or the device 12 itself, may be included in another component in accordance with a particular environment in which the device 12 is utilized. As will be described in following paragraphs in more detail, software may be installed on the device 12. Such software may include a computerized card game which utilizes the techniques herein.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the server 15 and/or other components. In one embodiment, the software including a computerized game utilizing the techniques herein may be downloaded from a network location, such as an Internet site, to the device 12 for execution thereon.

It should be noted that although the device 12 is illustrated as having network connectivity to the server 15, the techniques described herein may be used in connection with a device directly connected to the server 15 without a network. Furthermore, it should also be noted that the device 12 may also operate in a standalone mode with no connectivity to a server. In such instances, software may be installed on the device 12 without downloading the computerized game from another location. For example, the computerized game may be installed from a CDROM purchased in a shrink-wrap form and then installed on the device 12.

Figure 2:
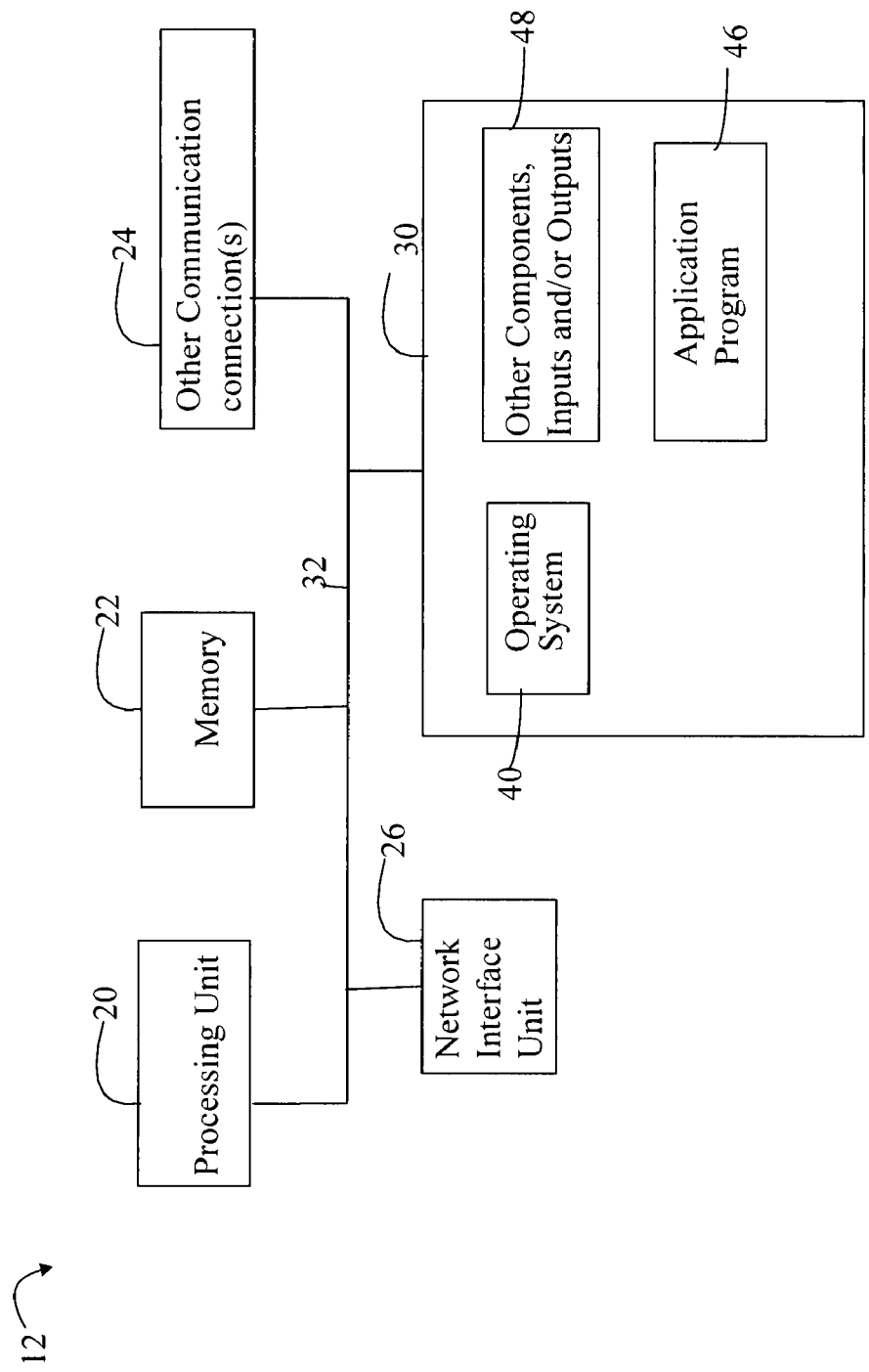
FIG. 2 is an example of an embodiment of components that may comprise a device of FIG. 1.

Referring to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media may be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12.

The device 12 may also contain communications connection(s) 24 that allow the computer to communicate with other devices and components such as, by way of example, input devices and output devices. These and other devices are well known in the art and need not be discussed at length here.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, and other components, inputs, and/or outputs 48.

The operating system 40 may be any one of a variety of commercially available or proprietary operating systems. The operating system 40, for example, may be loaded into memory in connection with controlling operation of the device 12.

The application program 46 may be software installed by a user on the device 12. As described above, the application program may be a computerized game with cards utilizing the techniques herein. The game may be, for example, a solitaire card game having cards in motion. The solitaire card game may be associated with an environment in which the cards exist. The motion of the cards may be determined based on properties of the individual cards, the environment, and/or user actions and selections. For example, a card may have a property causing it to be attracted to selected other cards, repulsed from selected other cards, remain face up or down, are displayed partially face up, and the like. For an environment, the cards may be floating on a water surface in a fountain. The environment may include conditions regarding the water flow rate in the fountain affecting the amount of time cards are on a display device for play. A user selection, such as of a card in the water, may cause a ripple effect turning over nearby cards. The motion of the cards may also be determined based on the properties of the individual cards and/or the environment independent of user actions and selections. In connection with the foregoing example, the cards may have a movement and direction determined by the environment even if the user makes no selection or action. Exemplary environments, properties of the cards, and user actions in the various environments affecting card motion and lifetime of a card are described in more detail elsewhere herein.

It should be noted that the server 15 of FIG. 1 may include one or more computers with components similar to those described in connection with FIG. 2. As described above in one embodiment, the application program 46 may be downloaded from the server 15 for use on the device 12.

Figure 3:
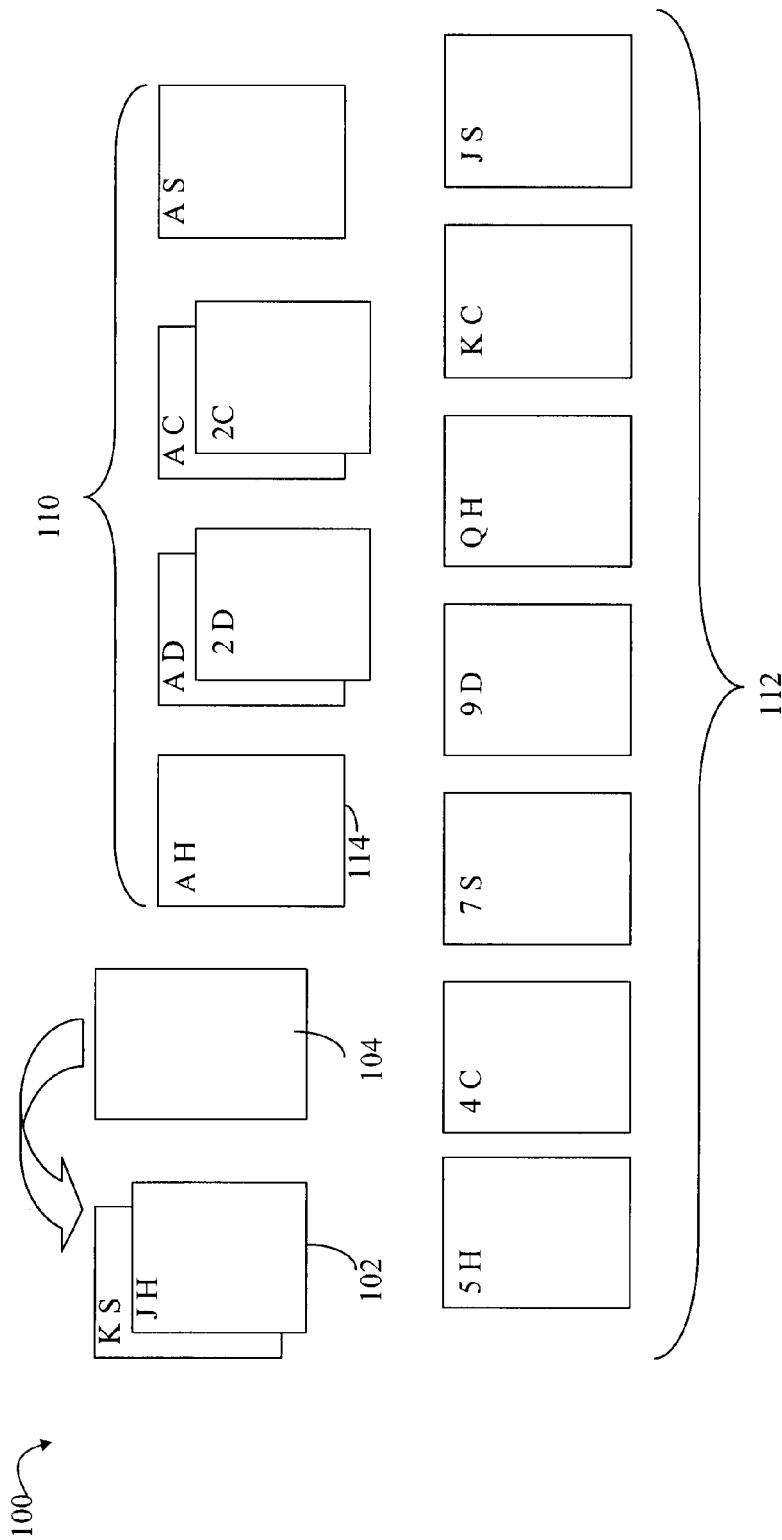
FIG. 3 is an example illustrating cards in connection with a traditional solitaire card game.

Referring to FIG. 3, shown is an example illustrating the traditional card game of solitaire. The example 100 includes a stock or draw pile 104 from which cards are drawn for play. Element 102 is the discard pile. Element 110 represents the foundation or build piles on which the user builds runs of cards of a same suit, one build pile for each suit. Points are based on the cards included in 110. Element 112 represents those piles referred to as tableaus. Cards are drawn from 102 for play on the piles 112 upon which runs are built. Cards are selected from 102 and 112 to complete runs on the foundation or build piles 110. The foregoing illustrates names of the different card piles in connection with a traditional solitaire card game known in the art. These names are used in connection with describing exemplary embodiments and illustrations in connection with techniques described herein for cards in motion.

Another convention used herein is notation for identifying cards and their associated suits. A card may be characterized as having a value (2, 3, 4, 5, . . . J, Q, K, A) and an associated suit. Each of the four cards suits is denoted by the first letter of the suit in upper case (e.g., hearts "H", diamonds "D", spade "S", and club "C"). When referring to a particular card such as the "Ace (A) of hearts", the card may be represented as "AH" as illustrated with element 114.

In connection with existing card games, such as solitaire, the cards move only in response to a limited set of user actions and may only have a limited defined set of responses performed in response to a user action. For example, in traditional solitaire, cards remain on the stock or draw pile 102 until user selection of a card or movement of a card between piles. Other user actions, such as attempts to place cards elsewhere on the display besides to a card stack, may not affect card play or motion. If there is no user selection or action, the cards may remain in the same position on the display.

As described in following paragraphs, techniques may be used to cause card movement which is not limited to being done in response to a user action. When a card does move in response to a user action, the card movement may be affected by the user action in combination with other factors such as, for example, attributes or properties of the card, and/or current factors of a dynamically defined playing environment in which the cards exist. Additionally, as will be illustrated, cards may move in response to conditions of a gaming environment being simulated without any user action. The lifetime of a card as related to the amount of time the card is displayed may also vary with attributes or properties of the card, environmental conditions and/or user actions. An attribute or property of a card may be a characteristic of the card affecting the card's behavior or movement in the environment being simulated.

It should be noted that variations of solitaire are described for purposes of illustrating the techniques herein, it will be appreciated by those skilled in the art that the techniques may be used in connection with other electronic card games.

Figure 4:
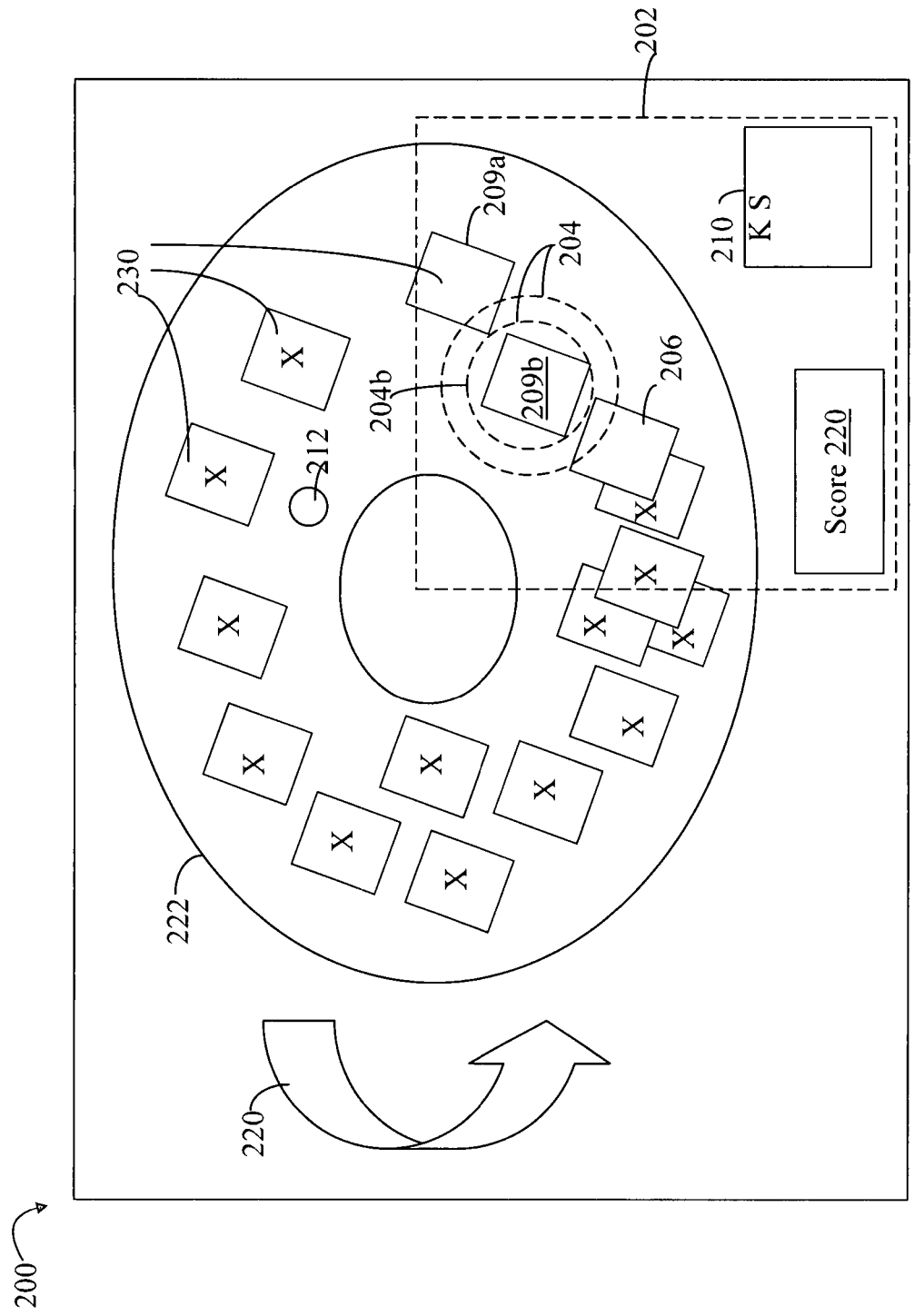
FIG. 4 is an example illustrating a version of solitaire with cards in motion in a fountain.

Referring to FIG. 4, shown is a first example illustrating cards in motion in a first exemplary embodiment of a computer card game of solitaire. The example 200 illustrates cards on a water surface of a fountain 222 with a view looking down on the fountain. The circular movement of water in the fountain affecting the movement of the cards therein in a curved counter clockwise path is denoted by 220. The cards are depicted as rectangular elements, such as 230, in the fountain 222. The cards may be face up or face down as denoted by an "X" on the card elements. The cards can overlay one another, such as card 206 overlaying another card. The cards may bobble on the surface based on ripples caused by a card selection, a user selection of the water surface without selecting a card, currents in water flow, and the like.

The environment being simulated for card play may be represented by the entire view of the fountain in 200. However, in one embodiment, only a portion of the environment with the cards may be viewed on a screen or other output display during play. For example, portion 202 may that which is displayed to a user in connection with playing solitaire. The remaining portions of 200 may be not displayed to a user but may be tracked by the game in connection with simulation of the environment and what is displayed at a point in time to a user. The defined behavior of the card movements may be relative to the example 200 for the entire environment. As such, cards move on/off the screen as they flow on the water surface of the portion 202. A card may be selected from the fountain but the selection must be made while the card is in portion 202. Otherwise, the user waits until the card is again in portion 202 after flowing around the entire fountain.

Cards may bobble on the surface of the water so that bottom surface of card may be intermittently and partially viewable as the cards bobble at the surface. If the card is face down, the card may intermittently viewed as it bobbles affecting the card's horizontal and/or vertical orientation with respect to the water surface. Cards may or may not accelerate/decelerate at various points along the curved path due to water movement, such as a water source for the fountain.

Cards may be face up or face down. In one embodiment, cards may have a property of remaining face down unless temporarily turned over or bobbling at the surface. A player may select a card causing a ripple in the water over a defined region such as illustrated by the two concentric dashed rings of 204. In this example, 209b may be the selected card causing the ripple as indicated by 204. A user may also make a selection on the water surface where no card is located also causing a similar ripple affecting surrounding cards near the ripple point in the water. A ripple effect as denoted by the dashed circles 204 may cause cards within the water surface of the two circles of 204 to turn face up for a defined time period. If a card is selected, the selected card may flip over as well for a defined time period. In this example, the cards have a property that they will remain face down on the water surface unless turned over via user selection or due the card being within the area of a ripple in the water (e.g., such as within the area of 204). Cards turned face up due to a card selection or a ripple effect may remain face up for a time period such as, for example, 3 or 4 seconds, after which the cards return to their face down orientation. Cards may also appear partially face up, for example, due to bobbling at the water surface.

The ripple may cause all cards within a defined ripple zone as illustrated by the concentric circles 204 to flip over for a time period. It may be that only the cards touched by the inner ripple concentric circle 204b flip over. The cards affected by the other outermost concentric circle of 204 may bobble at the surface so that perhaps the cards do not flip over or turn face up but rather they bobble at the water surface allowing a user to view a portion of the card faces. For example, if a card is only affected by the outer concentric circle of 204, the card may bobble so that the user can only detect whether the card is a J, Q, K but not the card's suit.

In this environment, the cards have the property of remaining face down. The environment includes a fountain with a water flow that affects the amount of time or lifetime of a card on the display until the next time the same card comes around the fountain to the viewing portion of the screen 202. The playing view 202 is only a portion of the environment although an embodiment may choose to display all or varying portions of 200 in connection with display to a player.

In this example version of solitaire, the foundation or build pile is 210 in the lower right corner. The cards in the fountain serve as a card source and discard. A user can select any card that is face up or down in the water of the fountain. In this variant of solitaire, the user tries to construct a run of cards on 210 without regard to the suit or color of the suit. In other words, the object is to construct consecutive increasing or decreasing runs of cards on 210 (e.g., A 2 3 4 5 6 or 10 9 8 7). The cards that are off-screen (e.g., not included in portion 202 on a user's display) in the fountain are the stock or draw pile.

Cards on screen display (e.g., included in portion 202) in the fountain are the equivalent of tableau pile(s) from which a user constructs runs on the build pile 210.

In this game, there may be points for every card in a run or sequence and the number of points increases with each card in the run constructed on 210. For example, the first card in a run is 5 points, the second card is 10 points, the third card is 15 points, and the like. A player may end or break a run by selecting a card for placement from the fountain on the foundation or build pile 210 and the card is out of sequence. When such a card is placed from the fountain onto the pile 210, the current run is broken, a score for the current run is determined, and scoring for a new run begins with the selected card. The number of points may be added to a total score displayed in 220. In the example, the build pile has a KS (king of spades). The player is trying to build a run so that the player is looking for a Q (queen) or A (ace) of any suit in the water for selection to be placed on the KS. A user may select an A from the fountain to be placed on the build pile 210. The selection also causes a ripple in the water. The ripple may be defined by the two concentric circles and cause cards within the innermost circle to flip over for a time period. Cards within the outermost concentric circle may bobble so that the player can view the card but not its suit. It should be noted that a card may be selected for play when face up or down. Thus, players may remember particular cards that were face up at a previous time and select such cards even when face down.

Power-ups may be used in connection with the solitaire game illustrated in FIG. 4. In connection with the techniques herein, power-ups may be characterized as extensions or variations of existing rules of play and/or environmental conditions granted to a player based on power-up triggers. In connection with modifying environmental conditions, power-ups may, for example, change velocities, friction, turbulence, ripple size, and the like, as may be appropriate for the particular environment. Examples of power-ups include, for example, providing hints to a player such as what card to select next for play, allowing a player to perform a play not allowed in the normal rules of play, such as allowing a player to undo a previous move, and the like. Power-ups may be of varying types. A first type may be saved or retained by a player for use at a subsequent time or at the current time. Another type of power-up may only be used immediately. Power-ups may be obtained in a variety of different ways or using a variety of different triggers that may be included in a computerized game. Power-up triggers may take the form of special, selectable objects appearing in a game, such as a coin in the fountain which, when selected, results in a power-up to the player. Power-ups may also be obtained by a player upon reaching certain incremental point thresholds.

In the example 200, coins in the fountain may be power-up triggers. A coin 212 may appear in the fountain on a bottom surface for a small time period and may not be selectable if, for example, obscured by an overlaying card floating on top of the coin. If a user selects the coin, the coin may be a power-up to slow down the water flow affecting the cards, cause the card positions to remain stationary for a time period, change or increase point values for cards selected during a time period, or turn all cards on the display face up and remaining still for a time period. This provides an advantage to a user in connection with playing those exposed cards. Power-up triggers can be special cards selectable for play such as a joker or other wild card which can be played immediately or saved for later use. The special cards may be included in the fountain 222 with all other cards. In connection with constructing a run on 210, a joker or wildcard may be usable as any card, any card of a particular suit, and the like. A power-up may have either an immediate effect only or may be of a type that can be collected by a player for use at another time selected by the player. As further examples of power-ups, a power-up may affects scoring for a currently active run such as providing double point values for an active run when played.

Settings for environmental conditions and factors, as well as the environmental conditions themselves, may vary in accordance with the difficulty or skill level selected for a game. For example, an embodiment of solitaire may have two or more skill or difficulty levels with different environmental conditions and settings for each level. The size of the ripple effect (e.g., such as illustrated by the dashed rings of 204) may decrease as the level of difficulty increases. Thus, a single ripple at an easier playing level causes more cards to be turned face up. The level of difficulty may also affect the amount of time a card remains face up, the speed of the water flow in the fountain (e.g., higher difficulty level has higher water flow rate), the size of cards (e.g., larger cards at higher difficulty levels), view port of the environment (e.g., larger view port with easier difficulty levels), and the like. The level of difficulty associated with a gaming level may also affect the power-ups available. For example, a higher difficulty level may have a lower rate at which power-up triggers, such as coins, appear in a game than another lower level of difficulty. As another example, power-ups which are credited based on point thresholds reached may have higher thresholds for more difficult levels.

With reference to FIG. 4, a solitaire game may have level 1, a beginning difficulty or gaming level, defining environmental conditions with a first card face up time (e.g., amount of time a card remains turned face up due to selection and ripple effect), a first water speed or flow rate of water in the fountain, and first ripple effect size indicating the diameter and number of circles associated with a ripple such as 204. Power-ups may be obtained by selecting coins appearing in the fountain at a first rate of frequency or based whether a point value for a run of cards reaches a threshold number of points. Selecting a coin may cause all cards on the display to turn face up and freeze for 3 seconds. Level 2 may be another gaming level having a higher level of difficulty than level 1 with card face up time less than the first card face up time. The water speed of level 2 may be greater than the first water speed causing cards to move more quickly in the water and remain on the screen for a shorter period of time. The ripple effect as illustrated by the dashed circles 204 may be smaller for level 2 than level I causing a smaller number of cards to turn over, bobble, and the like, with each ripple effect. Coins also appear in the fountain during level 2 play at a lower frequency rate than the first rate of level 1. The threshold number of points for a run at which a power-up is obtained is also higher for level 2 than level 1.

In connection with higher levels of difficulty, the power-ups may temporarily alter one or more environmental condition to be that of a lower, easier level. For example, a power-up at level 2 may cause the card face-up time and ripple effect size as illustrated by the dashed circles to increase for a time period.

It should be noted that the environmental conditions may also be individually tunable via a user interface.

The example 200 illustrates the card floating on water although there may be other surfaces used in connection with a variety of different environments in which the cards exist. Cards may, for example, float through air, on a frictionless surface, and the like. Cards are illustrated in the example of FIG. 4 as following a curved path. The environmental conditions for other environments may have other directions of movement such as linear, in a spiral, along the z axis, and the like.

As will be appreciated by those skilled in the art, the power-ups and associated triggers, and difficulty levels with settings for different environmental conditions may also be similarly applied for use with other embodiments.

Figure 5:
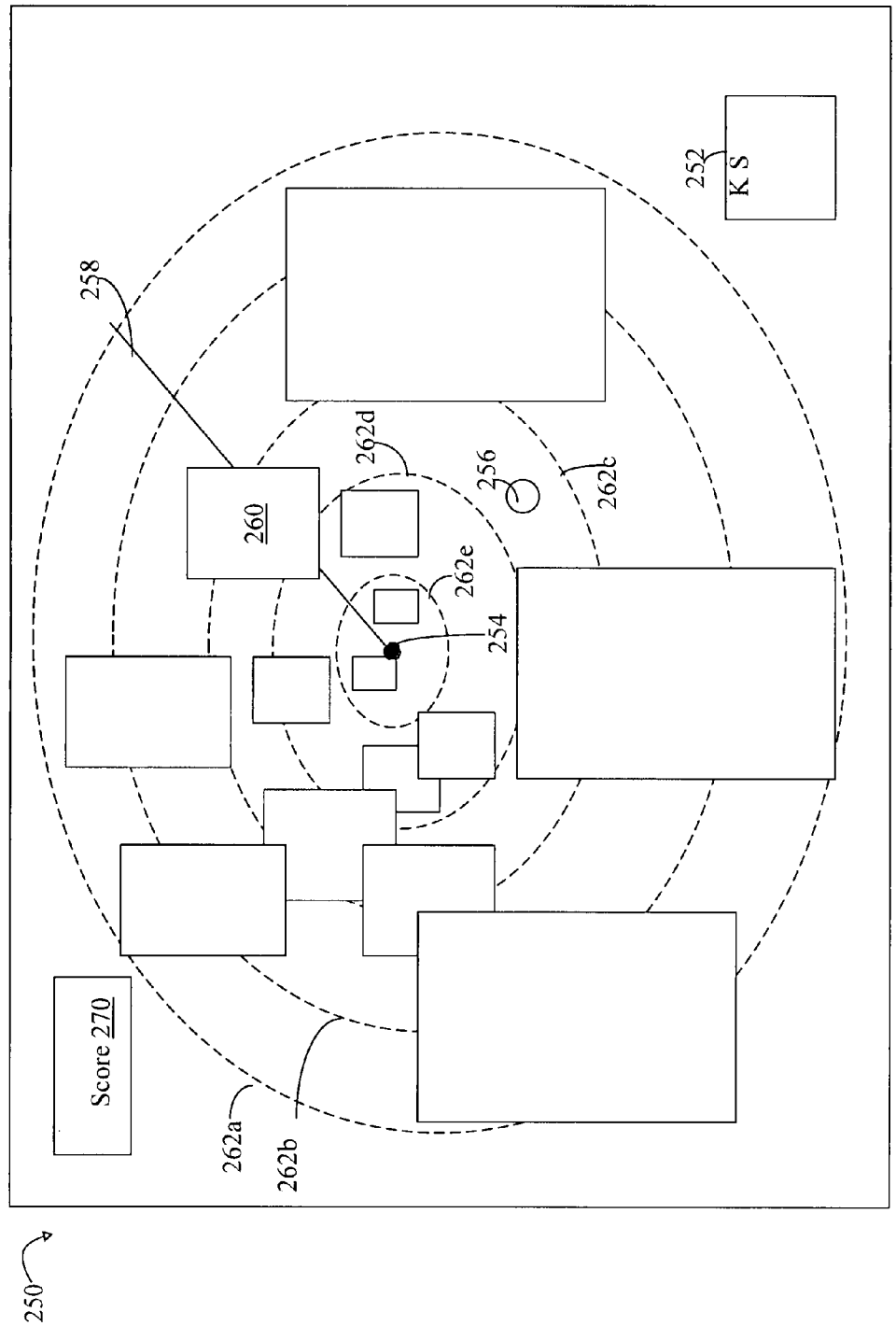
FIG. 5 is an example illustrating a version of solitaire with cards in motion originating from a center.

Referring to FIG. 5, shown is another example illustrating cards in motion in an exemplary embodiment of a computer card game of solitaire. In the example 250, the cards originate from a source, such as center point 254. The cards have an associated movement of originating from the source and flying towards the player. The cards increase in size as they come closer to the player until the cards fly passed the player and are no longer included in the display. Cards allowed to fly off the screen will again appear on the screen after a time period in another display cycle. In this environment, the cards on the display are the tableaus from which the user may select for play in the build pile 252. The player selects cards before they pass by off the screen since there will be a time period before the off-screen cards again appear. The value of a card during a first display cycle may be a first maximum value which is added to the score 270 if the card is selected for play. The next time the card is on the screen during a second display cycle, the card may be worth a lesser amount of points if selected for play. The point value of the card further decreases each display cycle.

The build pile is indicated by 252. A player may select a card from the display area for placement on the build pile 252. The total number of points 270 may be increased based on the point value for the card as indicated above. The run may be constructed as in the previous example by building a consecutive run of cards independent of suit or color. When a player selects a card for play which does not follow the sequence of the current run of 252, the selected card begins a new run. In one embodiment, the value received for a card in the run may depend on the point value of the card and the current number of cards in the run. For example, each first card in the run may have a point value equal to the card's point value. The card's point value may be based on the current display cycle for the card. The second card in a run may have a point value equal to twice the card's point value. The third card in a run may have a point value equal to three times the card's point value, and so on.

A card's point value if played may also be affected by which of the rings 262a-e is in contact with, or contains, the card when the card is selected. A selection within a ring closer to the center 254 may be worth more points than a card which is selected at a point further from the center 254.

In the example, the cards originate from the center 254 and appear larger and come out of the page at the player as the cards get closer to the player. The cards may follow a linear path from the center 254. For example, card 260 originating from the center 254 may follow a path indicated by 258. As a variation, the cards may be spiraling in an outward spiral pattern originating from the center 254 so that a card follows a path of the outward spiral pattern formed from the circles 262a-e. The cards may also have a reverse direction with respect to the point 254. In other words, the cards may fly into or towards the center 254 from off the screen and decrease in size from larger to smaller as approaching point 254. This reverse effect into the center may be used for linear paths or spiraling paths for the cards. In an embodiment having cards originating from the center 258, the rate at which the cards fly off the screen or originate from the source may be varied. Similarly, the rate may also be varied with cards having a reverse direction into point 254.

The cards illustrated in 250 may remain face up, alternate between face up and down for defined time periods, or some other pattern.

Selection of a card from the example 250 without placing the card on the build pile 252 may result in the card being discarded and removed from the display.

Similar to as described herein with the example of FIG. 4, power-ups and different gaming levels of difficulties with associated settings may be utilized in connection with FIG. 5. Power-up triggers may include jokers or wildcards as well as special objects in the display. The objects may have an identity related to the particular environment or the object may be an object distinct from the cards, such as object 256 may represent a power-up trigger causing a power-up if selected. For a given gaming level or difficulty rating, a set of environmental conditions may be defined similar to as described above with FIG. 4 but with variations for the environment of FIG. 5. For example, each level of difficulty may be associated with environmental conditions including a setting affecting the rate at which cards originate from the center 254 and fly on the screen towards the player. A higher level of difficulty may have a higher rate causing cards to remain on the screen a shorter period of time for play. Power-ups, when activated, may have effects similar to as described in connection with FIG. 4 such as affecting the speed of card motion, causing cards to freeze for a time period, changing the size of cards as they move progressively closer to the player, changing settings temporarily to those of an easier level of difficulty, and the like.

Figure 6:
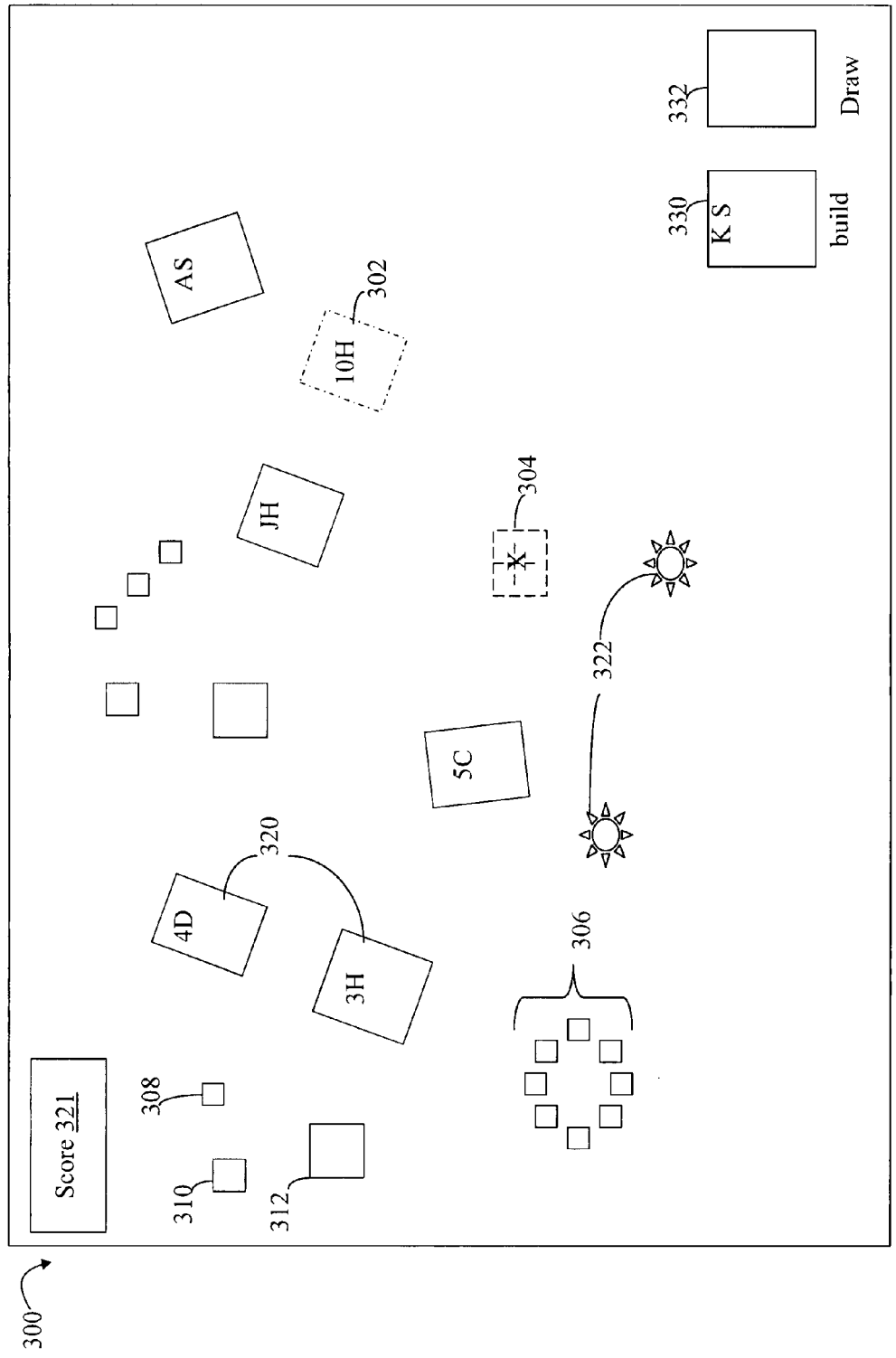
FIG. 6 is an example illustrating a version of solitaire with cards which sprout from a seeding point on the screen.

Referring to FIG. 6, shown is another example illustrating cards in an exemplary embodiment of a computer card game of solitaire. In this example, each card sprouts or grows from a small box or other entity and goes through a lifecycle. As an analogy, each card sprouts from a seed as represented by the small boxes or other entities 306 on the display. Each small box or other entity goes through a growth process, such as represented by a sequence of boxes 308, 310 and 312. When the entity grows to a box of a size such as illustrated by 312, the box subsequently sprouts into a new card such as one of 320. The card is visible on the display for a defined time period. The card then disappears from the display at the end of its lifetime (e.g., the card "dies") causing a ring 306 of new small boxes or other entities to appear. The dying card may be characterized as a parent with respect to the new cards which result from the ring 306. A new card grows or sprouts from each of the entities in 306.

Element 302 is an illustration of a disappearing or dying card at the end of its current lifetime. The card may be illustrated as dying by fading away with different levels of translucency as the card progressively "dies" or disappears from the display. In other words, the ring of 306 may appear as a result of a card "dying" as illustrated by the card fading out of the display 302.

Element 304 may illustrate a form of visual feedback at a position on the display when a card is selected from the location for play in the build pile 330. This example 300 also includes a draw pile 332 so that cards such as 320 included in the display may be selected as well as cards from the draw pile 332. Element 320 are examples of playable cards. Selection of a playable card results in 304 appearing on the display at the card's location. The selected card may then be placed in the build pile 330 for building a run of cards. A run of cards may be defined by rules of a first solitaire variant as described above in which the run is a sequence of cards independent of color or suit. The run of cards allowed for this and other exemplary embodiments may also be defined by another variant in which the run is a sequence of cards of the same color or suit. Scoring associated with the cards a run may be as described in connection with other examples in which the point value per card in the run increases with each next card. In the event that the player wishes to end the run, the player may select a new card from the draw pile 332 or other playable card from the display area of 300 breaking the current run. The selected card is placed on the build pile 330 and scoring for a new run commences. Element 321 represents a current score displayed.

FIG. 6 includes cards which sprout from the seed entity in the ring 306. In this example, the seed entity may be represented by a small box which grows and eventually unfolds into a new playable card visible for a time period. As long as the card and its identity is visible, it may be playable. Once a card dies and disappears from the display, it may again be sprouted as a new card at a later point in time. A card may not be playable or selectable for play until the sequence of boxes or other entities sprouts into a card at a point in a lifetime of the card. With respect to this example, the card is not selectable for play until the identity of the card is displayed. The identity of the card is the suit and value of the card. To further illustrate, a card when represented in a form of 306, 308, 310 or 312 may not be selected for play until the card is sprouted with its identity, for example, as with one of the cards of 320.

An embodiment may determine the identity of each new card produced based on attributes or properties of its parent card. In the example 300, as each parent card dies, a ring 306 results. Each entity in the ring may result in a child card having a property determined in accordance with its parent. For example, each child may be a randomly selected card value (e.g., 2, 3, 4, . . . J, Q, K, A) having a same suit as its parent. Properties of the children may be determined based on previous player selections and actions related to the parent as well as other cards. For example, children may have a suit determined based on all the previously selected cards. The greater the frequency of selection of a card suit during a current game play, the greater or lesser the probability of a card of the suit being generated. If all card suits are selected for play an equal amount of time, the probability of generating a card of each suit may be equiprobable. The lifetime of a card may be determined based on the lifetime of all other cards. If a card is selected for play, its lifetime may be deemed ended. For example, the lifetime of a card may be determined based on the average lifetime of all cards in the game up to a current point in time. The average may be used as the amount of time which a card is visible in some representation on the display.

Similar to as described herein with the example of FIG. 4, power-ups and different gaming levels of difficulties with associated settings may be utilized in connection with FIG. 6. The increasing level of difficulty may result in decreasing the amount of time in which a card is visible or playable for the given environmental conditions of the example 300. Power-up triggers may be represented as unique objects, such as 322, causing a power-up if selected as described elsewhere herein. Power-ups may provide the player with advantages for the particular environment of FIG. 6. For example, a power-up may cause the cards to freeze on the display for a time period or otherwise increase the lifetime of cards on the display. Each card may remain in the same location on the display, or may move to different locations on the screen in accordance with a defined pattern. A card may, for example, rotate about its center in a clockwise or counterclockwise direction at the location on the display from which the card sprouts. The point values of a card may be higher if selected for play earlier in a single lifetime of the card. A subsequent lifetime of the same card may have lower point values than those of a previous lifetime for the card. The level of difficulty may affect environmental conditions particular to FIG. 6. For example, the level of difficulty may affect the number of offspring in ring 306 with more offspring being generated in a single ring 306 if there is a higher level of difficulty. As another variation of the embodiment illustrated in FIG. 6, each card may move around to different screen positions in accordance with a random or predetermined pattern. Whenever two cards of different colors arrive at the same position, the cards may reproduce and sprout new cards as described above with reference to FIG. 6.

Selection of a card from the example 300 without placing the card on the build pile 330 may result in the card being discarded and removed from the display.

Figure 7:
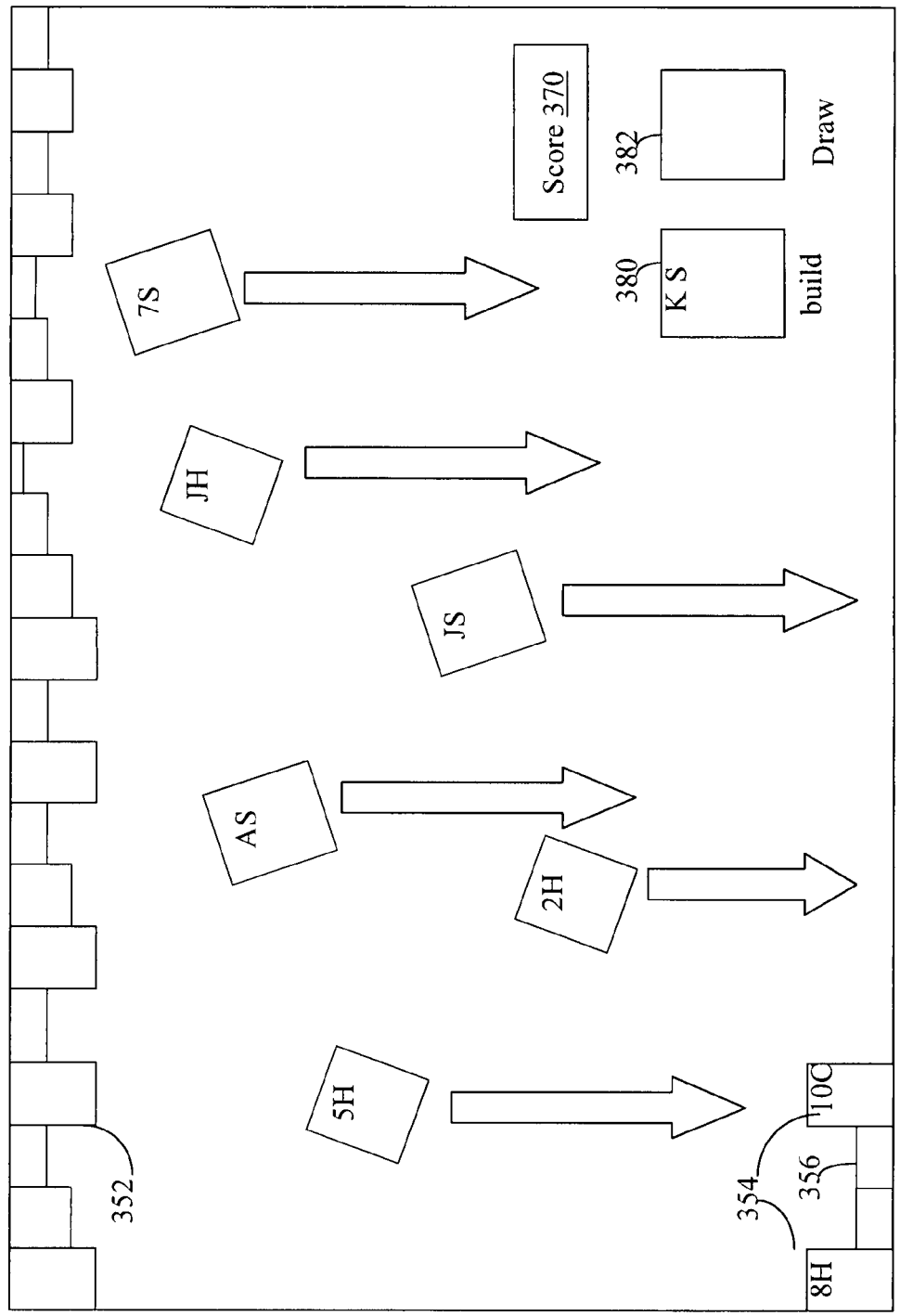
FIG. 7 is an example illustrating a version of solitaire with cards having a falling motion.

Referring to FIG. 7, shown is another example illustrating cards in motion in an exemplary embodiment of a computer card game of solitaire. In this example 350, the cards fall from a canopy of cards 352 in a linear downward motion path relative to their point of origin or starting falling point from within 352. In one embodiment the falling cards may accumulate at the bottom as illustrated by 354 and 356 obscuring one another as they pile up. For example, cards 354 may still be selected for play but card 356 is not visible and may not be selected for play in this example. Card values may decrease as a falling card gets closer to the ground. As a variant to the environment of 350, a wind may occasionally blow the cards from the display causing falling cards to have a motion path in a direction of the wind. For example, a wind may blow from the right to the left and cause falling cards to have a motion path off the screen to the left. When the wind stops, cards may resume falling in a linear downward motion with no wind effect. The inclusion of wind as an environmental condition may vary with game level or level of difficulty. For example, the beginning level may not have wind as an environmental condition. However, more advanced and more difficult gaming levels may introduce varying degrees of windiness which increase with level of difficulty.

As with the other examples, the object may be to construct a run of cards as large as possible on the build pile 380 and commencing with a new run when there appears to be no further progress with a current run. A player may break a run by selecting a card out of sequence with respect to a current run which has fallen from the canopy 352 or which is on the draw pile 382.

Similar to as described herein with the example of FIG. 4, power-ups and different gaming levels of difficulties with associated settings may be utilized in connection with the particular environment of FIG. 7. Playing a power-up may, for example, cause falling card motion to decrease or freeze for a time period.

In connection with all the exemplary embodiments herein, although a solitaire card game has been presented for illustrative purposes, the techniques herein may be used with other variations of solitaire and other card games including traditional card games such as crazy eights, hearts, poker, rummy, other casino card games, and the like. Additionally, the techniques herein may be used in connection with single or multiplayer games where the players may be virtual or real. For example, with a multiplayer card game such as rummy, a card deck source as in FIG. 4 may be used. If there are 4 players, each player may have a screen view which is a different quarter of the entire environmental display of FIG. 4.

As described herein, properties of cards, such as card's suit or color, may affect the motion of the card, lifetime of a card, and the like. With respect to the environment of FIG. 7, properties of a card may cause the card to alter its default downward linear motion path. For example, cards of a same suit or color may be attracted or repulsed from one another. If two cards of a same suit have default paths within a certain distance from one another, the two cards may be attracted to one another causing them to float in a downward path slightly varied toward each other.

In connection with the different environments in which the cards of a game exist, different techniques may be used in connection with advertisements or sponsorships. For example, games downloaded from a website may utilize sponsorships. A sponsor may pay the website an amount of money for the website to include an advertisement for a sponsor's product in the games. For example, the card backs may have a logo thereon for the sponsor. The environment may also include sponsor information on other objects in the card playing environment. For example, a sponsor may be a pool toy manufacturer and a game of solitaire may include objects, such as pool toys floating in the water of FIG. 4. The toys may be those of the sponsor with an appropriate sponsor logo thereon. The pool toys may or may not be selectable for use in game play. As another example, the image used to indicate a power-up such as on a face of 322 of FIG. 6 may include a sponsor's logo. The object used as a power-up may also represent an article of manufacture by the sponsor or advertiser. As another example, a software vendor's product may be represented as a box in an environment such as in FIG. 6 or 7 which floats across the screen. The box may be a power-up trigger. The box may also be an object in the environment which is not used in connection with player interaction and game play.

Figure 8:
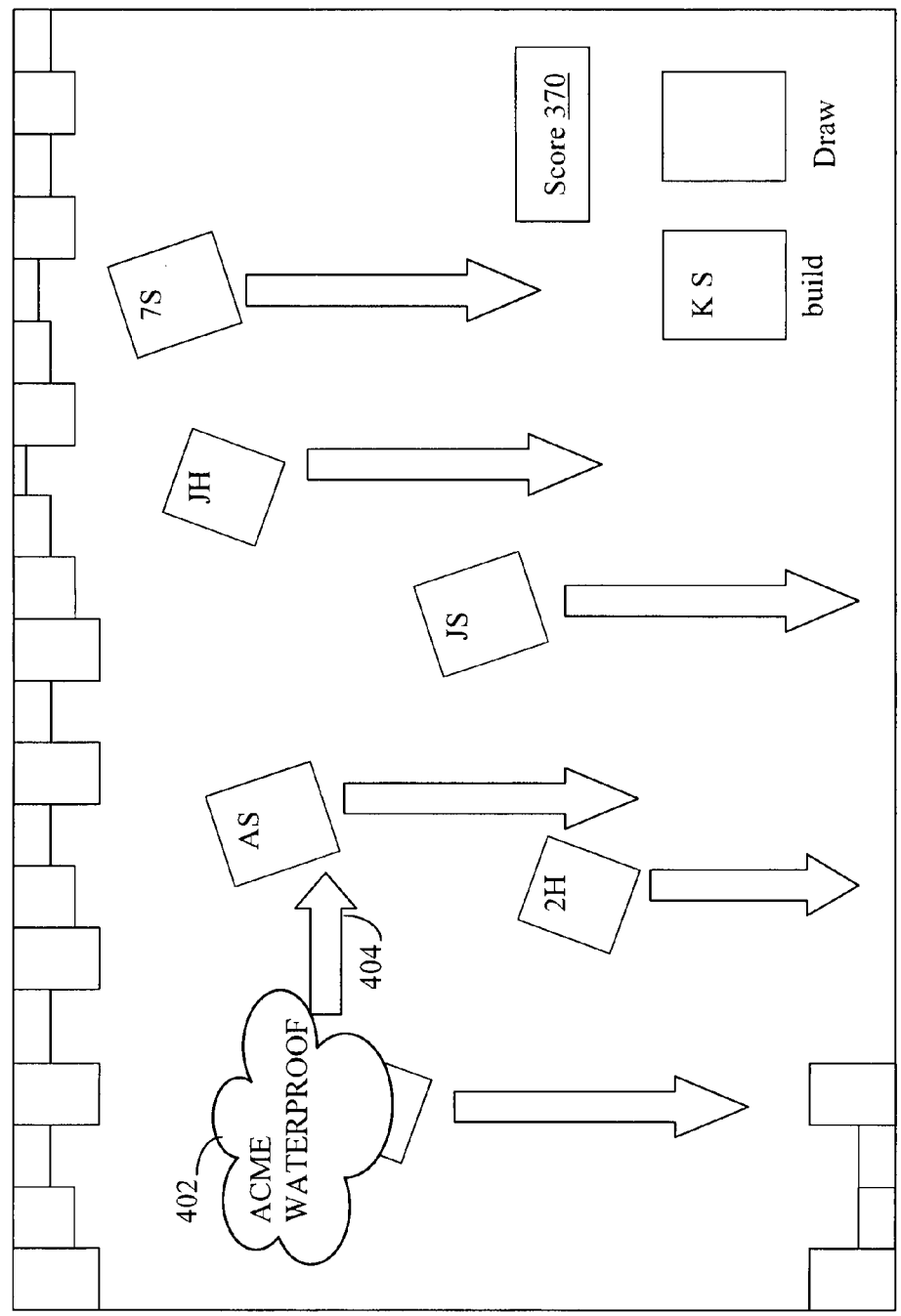
FIG. 8 is an example illustrating use of objects in the environment for sponsor advertisements.

Referring now to FIG. 8, shown is an example illustrating use of sponsorship in connection with a playing environment of FIG. 7. In the example 400, a sponsor may be ACME WATERPROOF. The solitaire game may include cards in a sky with clouds such as 402 having a horizontal linear path as illustrated by 404. The cards may be face up. The view and play of the cards may be obstructed while clouds pass over and cover the cards.

Figure 9:
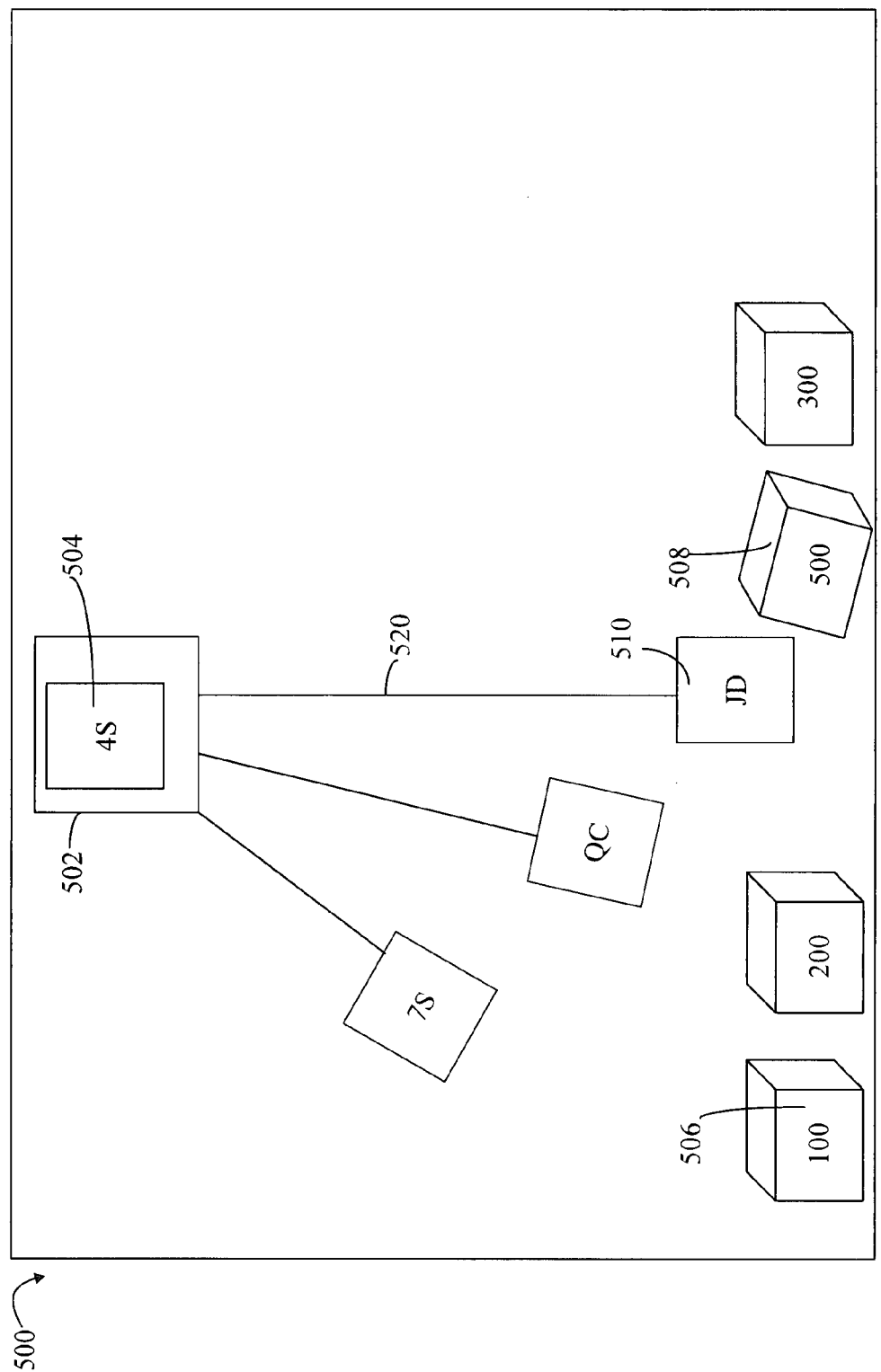
FIGS. 9-11 are examples illustrating other environments for card motion.
Figure 10:
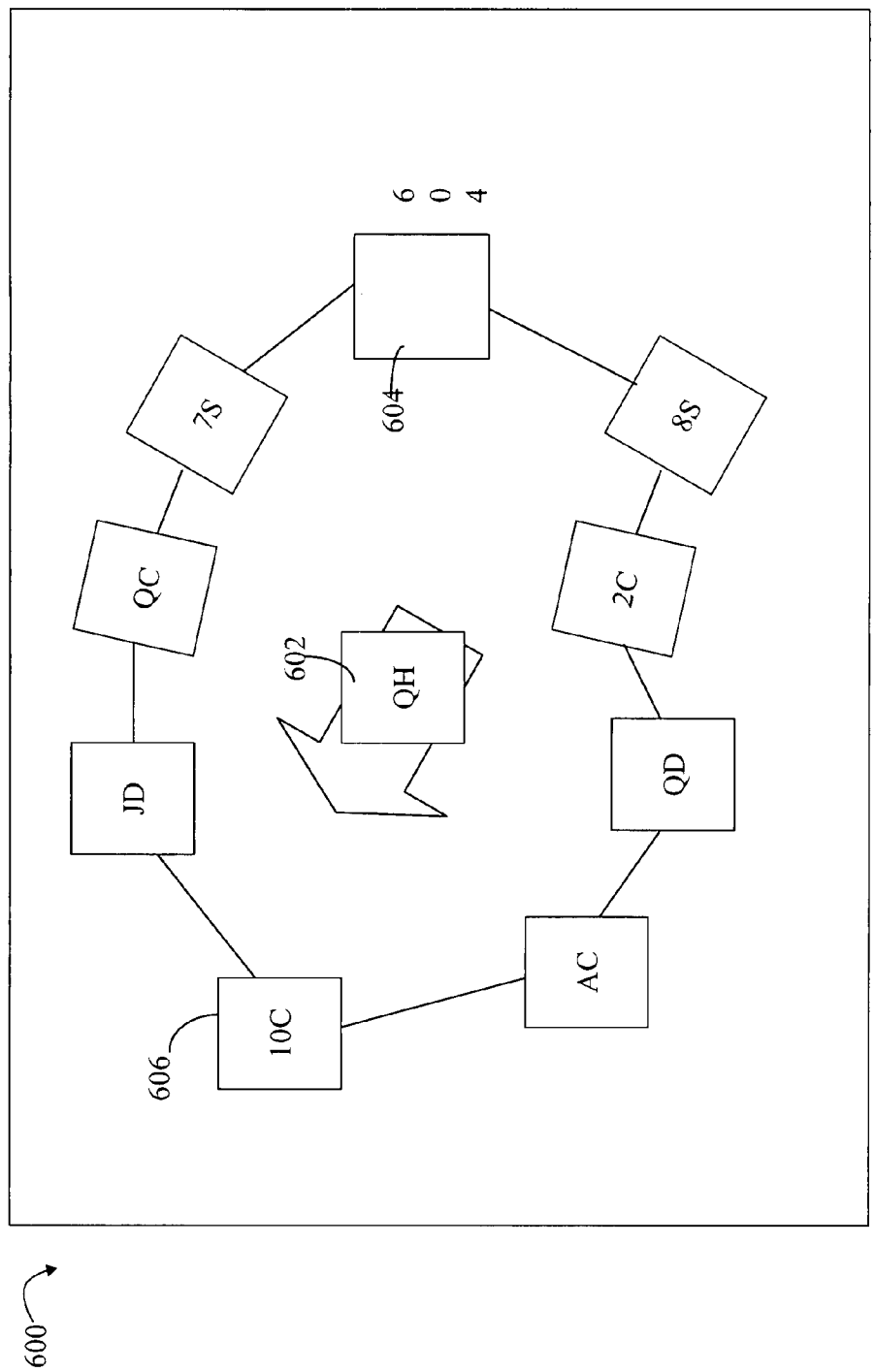
Figure 11:
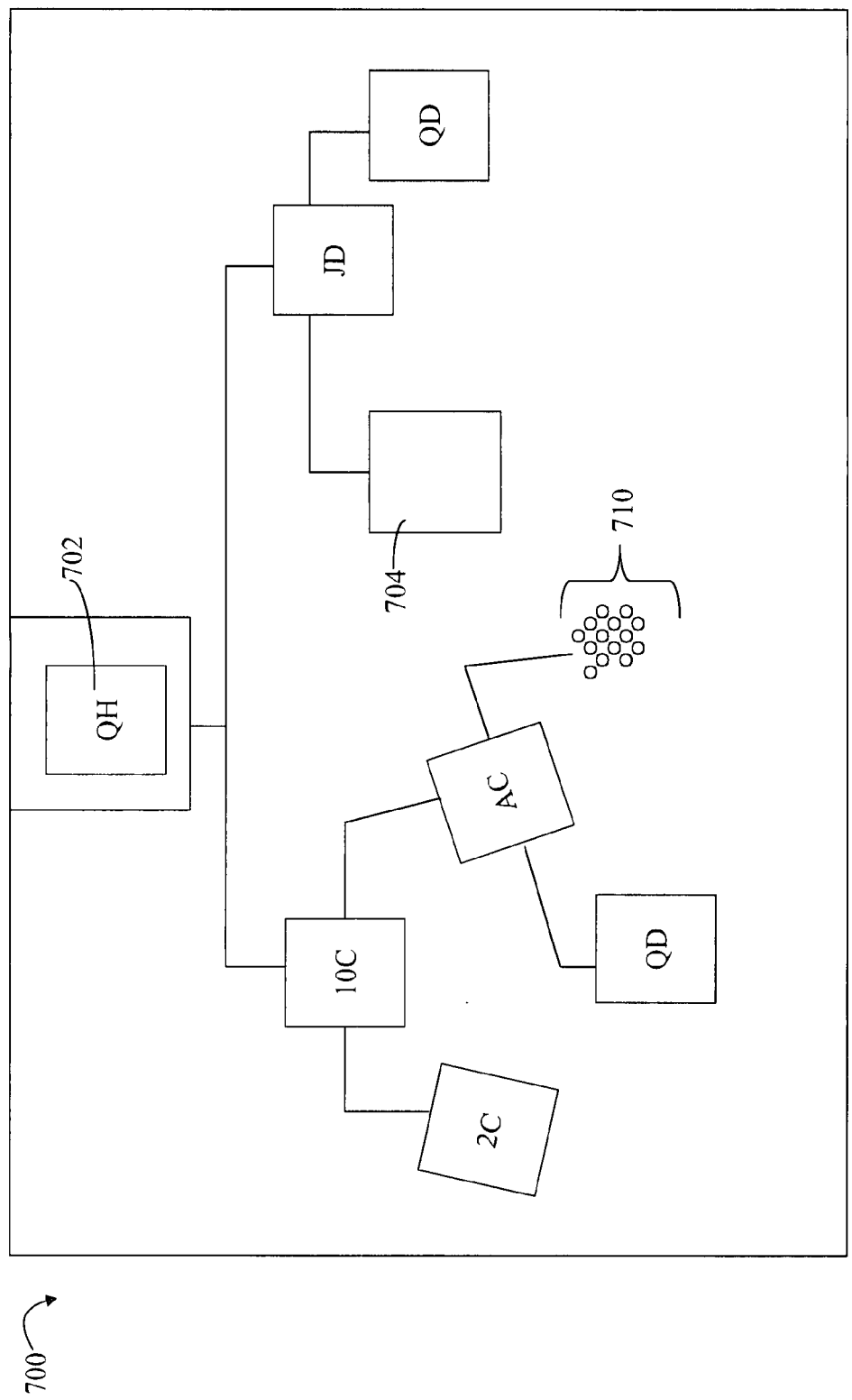

What will be illustrated in FIGS. 9-11 are several other exemplary environments illustrating card movements in connection with a solitaire game.

Referring now to FIG. 9, shown is an example of cards swinging from a pendulum. The movement of a card in the example 500 is determined based on the arc of a pendulum swing based on the length of the card's string or position from element 502 such as illustrated by element 520. Element 504 may be the pile where a player builds a run of cards. A card may be selected from those swinging such as element 510. The element 510 may have a point value determined based on what object the swinging card hits, such as element 508. Once a card is selected, a new card may replace the previously selected card and follow in the previously selected card's swinging pattern. For example, once element 510 is selected, another card may appear in place of the selected card of 510 having a swing based on 520. The rate at which a card swings may increase with skill level. After a certain number of swings back and forth, a card may be replaced with a new card.

Referring now to FIG. 10, shown is an example of cards having a movement along a predetermined circular pattern in a clockwise or counterclockwise direction. Element 602 may represent the build pile where a player builds a run of cards. A card, such as element 602, may be selected for placement on the build pile 602. The cards, as illustrated by 604, may also turn face down at various points when moving in the pattern.

Referring now to FIG. 11, shown is an example of cards that balance in a hanging mobile. The cards in the example 700 may have a movement based on simulated environmental conditions, such as wind. The cards may move as if suspended in a mobile as illustrated. The cards may rotate so that the cards may face away as illustrated by 704. After a defined time period, a card may be removed from the display and replaced with a pattern, such as 710. Cards may be added to the mobile as newly suspended cards forming a new branch of the mobile as well as replacing cards such as in position 710. Element 702 illustrates the build pile where a user may build a run of cards.

The techniques herein may be used in an embodiment of a computerized game with cards. The movement of the cards may be based on simulation of real world physics for a given environment affecting the position, orientation, availability, and/or visibility of cards in the environment. Environmental conditions affecting the movement and position of cards may affect, for example, x, y, and z screen coordinate positions coordinates as well as relative size of the cards, rotational movement, acceleration, and the like. The techniques herein may be used to create a sense of urgency that introduces consequences for inaction such as not playing a particular card by a point in time. The techniques herein may be used to introduce spatial challenge playing in a non-uniform environment. The power-ups used in connection with the environments herein may be used to alter the environmental conditions and associated settings for the underlying environmental simulation. Additionally, described herein are techniques for facilitating embedded sponsorship using objects in the various environments.

It will be appreciated by those skilled in the art that the games herein as well as others utilizing techniques herein may be implemented using any one or more different programming languages and other graphics software, libraries, and the like that may be available in a particular embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a computerized card game having cards in motion comprising:

providing, by a computing system, a representation of a plurality of cards selectable for play in a simulated environment on a screen of a display output device, the simulated environment including a first set of environmental conditions for a first gaming level and a second set of environmental conditions for a second gaming level more difficult than the first gaming level, the environmental conditions affecting an amount of time a card is selectable for play, a position of a card, whether a card is face up or face down, and rate of card movement, wherein the simulated environment provides a power-up trigger for the second gaming level that temporarily changes one or more environmental conditions of the second set of environmental conditions to one or more environmental conditions of the first set of environmental conditions;

determining, by a processor of the computing system, a card movement and a rate of card movement of each card selectable for play across the screen along a motion path in accordance with a current condition in the simulated environment;

displaying the plurality of cards selectable for play in motion across the screen along the motion path, each card selectable for play moving at the determined rate until selected from the motion path, wherein:
cards moving across the screen along the motion path independently of player action become stationary in response to one or more defined player actions,
the first set of environmental conditions for the first gaming level includes a first amount of time for which the cards remain stationary in response to the one or more defined player actions, and
the second set of environmental conditions for the second gaming level includes a second amount of time smaller than the first amount of time for which the cards remain stationary in response to the one or more defined user actions; and
constructing a sequence of cards in response to player selection of a card selectable for play from the motion path as the card is moving across the screen along the motion path independently of player action.

2. The method of claim 1, wherein:
cards that are selected from the motion path move to a build pile displayed on the screen in response to the player selection of the cards,
the motion path includes a portion that is off the screen, and
cards that are unselected in a first display cycle move off the screen and then appear on the screen after a time period in second display cycle.

3. The method of claim 1, wherein:
the cards in motion are displayed in the simulated environment as floating cards on a water surface, and
the card movement of each of the floating cards along the motion path is determined by a directional flow of water in the simulated environment, and
the rate of card movement of each of the floating cards along the motion path is determined by a flow rate of water in the simulated environment.

4. The method of claim 3, further comprising:
displaying a floating card in a face down position on the water surface;
turning the floating card face up for a defined time period; and
turning the floating card face down after the defined time period independently of player action.

5. The method of claim 4, wherein the defined time period is determined in accordance with a difficulty level.

6. The method of claim 4, wherein:
selection of the floating card causes one or more other floating cards within a defined region to turn face up, and
the defined region is determined relative to a location of the selected floating card and a difficulty level.

7. The method of claim 6, wherein the simulated environment displays an object beneath the water surface as a power-up trigger which, if selected, causes one or more floating cards on the water surface to perform one or more of: remain stationary for a time period, turn face up for a time period, and turn partially face-up for a time period.

8. The method of claim 1, wherein each card in motion includes one or more properties affecting card movement of each other card in motion along the motion path.

9. The method of claim 8, wherein each card is displayed in a face down position by default.

10. The method of claim 1, wherein:
the cards in motion originate from a center point of the screen,
each card in motion moves along the motion path with respect to the center point and alternates between face up and face down positions independently of player action while the card is selectable for play,
each card in motion appears larger as the card moves along the motion path farther from the center point over time, and
a point value for each card is determined based on a location at which the card is selected with respect to the center point.

11. The method of claim 1, further comprising:
providing, by the computing system, a sequence of entities for a card, each entity in the sequence of entities for the card having a different size and corresponding to a different point in a lifetime of the card, the lifetime of the card representing an amount of contiguous time the card is displayed in the simulated environment;
updating the screen over time with different entities from the sequence of entities for the card at different locations during the lifetime of the card; and
showing an identity of the card during the lifetime of the card after at least one entity in the sequence of entities for the card has been displayed, wherein the card is not selectable for play in the computerized card game until the identity of the card is shown.

12. The method of claim 11, wherein:
the card is displayed and selectable for play in the computerized card game after the identity of the card is shown and until the lifetime of the card ends, and
the card fades from display when the lifetime of the card ends.

13. The method of claim 12, wherein the card rotates while selectable for play.

14. The method of claim 12, further comprising:
when the lifetime of a first card ends, displaying a plurality of first entities from a plurality of different sequences of entities for different cards.

15. The method of claim 14, wherein the different cards include an attribute of the first card.

16. The method of claim 1 wherein:
said simulated environment includes at least one object used in connection with advertising, and
said at least one object affects whether at least one card is playable at a point in time during play of the computerized game.

17. A computing device for providing a computerized card game having cards in motion, the computing device comprising:
a processor for executing computer-executable instructions; and
memory storing computer-executable instructions for providing a computerized card game having cards in motion, the computer-executable instructions comprising instructions for:
providing a representation of a plurality of cards selectable for play in a simulated environment on a screen of a display output device, the simulated environment including a first set of environmental conditions for a first gaming level and a second set of environmental conditions for a second gaming level more difficult than the first gaming level, the environmental conditions affecting an amount of time a card is selectable for play, a position of a card, whether a card is face up or face down, and rate of card movement, wherein the simulated environment provides a power-up trigger for the second gaming level that temporarily changes one or more environmental conditions of the second set of environmental conditions to one or more environmental conditions of the first set of environmental conditions;

determining a card movement and a rate of card movement of each card selectable for play across the screen along a motion path in accordance with a current condition in the simulated environment;

displaying the plurality of cards selectable for play in motion across the screen along the motion path, each card selectable for play moving at the determined rate until selected from the motion path, wherein:

cards moving across the screen along the motion path independently of player action become stationary in response to one or more defined player actions, the first set of environmental conditions for the first gaming level includes a first amount of time for which the cards remain stationary in response to the one or more defined player actions, and the second set of environmental conditions for the second gaming level includes a second amount of time smaller than the first amount of time for which the cards remain stationary in response to the one or more defined user actions; and constructing a sequence of cards in response to player selection of a card selectable for play from the motion path as the card is moving across the screen along the motion path independently of player action.

18. The computing device of claim 17, wherein:

cards that are selected from the motion path move to a build pile displayed on the screen in response to the player selection of the cards, the motion path includes a portion that is off the screen, and cards that are unselected in a first display cycle move off the screen and then appear on the screen after a time period in second display cycle.

19. A computer storage medium that does not consist of a signal, that computer storage medium storing computer-executable instructions that, when executed, cause a computing device to provide a computerized card game having cards in motion, the computer-executable instruction comprising instructions for:

providing a representation of a plurality of cards selectable for play in a simulated environment on a screen of a display output device, the simulated environment including a first set of environmental conditions for a first gaming level and a second set of environmental conditions for a second gaming level more difficult than the first gaming level, the environmental conditions affecting an amount of time a card is selectable for play, a position of a card, whether a card is face up or face down, and rate of card movement, wherein the simulated environment provides a power-up trigger for the second gaming level that temporarily changes one or more environmental conditions of the second set of environmental conditions to one or more environmental conditions of the first set of environment conditions;

determining a card movement and a rate of card movement of each card selectable for play across the screen along a motion path in accordance with a current condition in the simulated environment;

displaying the plurality of cards selectable for play in motion across the screen along the motion path, each card selectable for play moving at the determined rate until selected from the motion path, wherein:

cards moving across the screen along the motion path independently of player action become stationary in response to one or more defined player actions, the first set of environmental conditions for the first gaming level includes a first amount of time for which the cards remain stationary in response to the one or more defined players action, and the second set of environmental conditions for the second gaming level includes a second amount of time smaller than the first amount of time which the cards remain stationary in response to the one or more defined user actions; and constructing a sequence of cards in response to player selection of a card selectable for play from the motion path as the card is moving across the screen along the motion path independently of player action.

20. The computer storage medium of claim 19, wherein:

cards that are selected from the motion path move to a build pile displayed on the screen in response to the player selection of the cards, the motion path includes a portion that is off the screen, and cards that are unselected in a first display cycle move off the screen and then appear on the screen after a time period in second display cycle.

* * * * *